(12) United States Patent
Roberge et al.

(10) Patent No.: US 6,561,006 B1
(45) Date of Patent: May 13, 2003

(54) METHOD AND DEVICE FOR ADJUSTING A VANE AND VANE ADJUSTABLE BY SAID METHOD

(75) Inventors: Philippe Roberge, Issy les Moulineaux (FR); Serge Fromentin, Viroflay (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/857,201

(22) PCT Filed: Dec. 21, 1999

(86) PCT No.: PCT/FR99/03236

§ 371 (c)(1),
(2), (4) Date: Jun. 21, 2001

(87) PCT Pub. No.: WO00/39593

PCT Pub. Date: Jul. 6, 2000

(30) Foreign Application Priority Data

Dec. 23, 1998 (FR) .............................. 98/16353

(51) Int. Cl.$^7$ ............................................. G01C 25/00
(52) U.S. Cl. ....................................................... 73/1.75
(58) Field of Search ................................. 73/1.75, 1.78, 73/170.02, 170.05

(56) References Cited

U.S. PATENT DOCUMENTS 4,489,591 A * 12/1984 Myrick ...................... 73/1.78
5,361,633 A * 11/1994 William

FOREIGN PATENT DOCUMENTS

DE              1927355 A    * 12/1969

* cited by examiner

Primary Examiner—Robert R. Raevis
(74) Attorney, Agent, or Firm—Oblon, Spivak, McClelland, Maier & Neustadt, P.C.

(57) ABSTRACT

Weather vanes (1) are delicate instruments partially exposed to external conditions. They are used in particular in the aeronautical industry. The measurements provided by these weather vanes are crucial to the flying of an aircraft. A type of weather vane is proposed in which a vane can be changed. Changing the vane entails adjusting the orientation sensors (3). To perform this adjustment, use is made of a factory setting rig (16) that allows the various parts of the weather vane to be placed in a characteristic position.

13 Claims, 3 Drawing Sheets

METHOD AND DEVICE FOR ADJUSTING A VANE AND VANE ADJUSTABLE BY SAID METHOD

Figure 1A:
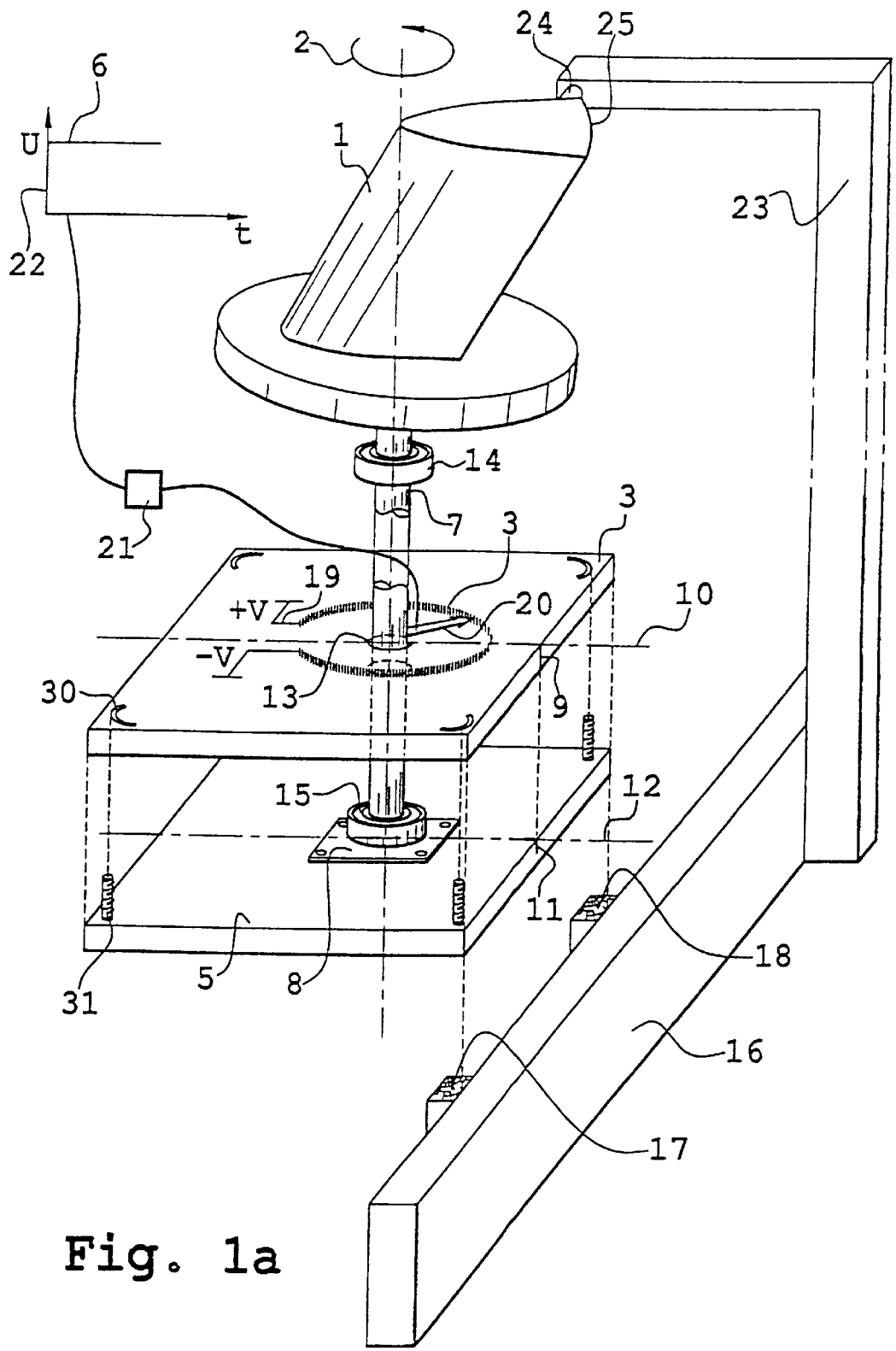

A subject of the present invention is a method and a device for adjusting a weather vane. Another subject is a weather vane that can be adjusted by this method. A weather vane is a device for measuring wind direction. The invention finds a more particular application in the aeronautical industry, where the adjustment of a weather vane is of vital importance. This is because the value of the measurement of the apparent wind direction for an aircraft makes it possible, after calculation, to obtain the value of incidence and lift parameters. These two parameters need to be known reliably because they allow optimum flight conditions to be ensured, but above all these are parameters which are critical to flight safety. The method of the invention can nonetheless be used in other fields, particularly in meteorology. Weather vanes installed at meteorological stations have also to be adjusted regularly, or even changed.

A weather vane is a member, part of which is external. This external part is subjected to climatic variations, particularly to temperature variations. In addition, it may become damaged by impact with external bodies, such as birds, grains of sand or bits of ice. More generally, it may become worn by external forces that may be applied to it. The conditions external to an aircraft are very harsh. The part of the weather vane that is directly sensitive to the wind is delicate. Forces applied to this device in the flight phase are very strong. These forces may also alter the adjustment of the wind-sensitive part with respect to orientation sensors to which it is connected.

For economical reasons, when the weather vane has to be replaced, only a limited part thereof is replaced. A weather vane thus comprises a vane that can move in the wind, a sensor support and a probe body. Sometimes only the vane hanged. A new vane has then to be fixed to a sensor support and to a probe body already in place, or a new vane and a new sensor support have then to be fixed to a probe body already in place. In such cases, there is a need for the orientation sensors to be adjusted on site with respect to the probe body, to suit the new weather vane thus formed.

Furthermore, airlines impose frequent checks on the adjustments. These checks may sometimes result in drifts being observed and therefore lead to the weather vane having to be readjusted. It would therefore seem necessary to implement a reliable and economical method for adjusting the weather vane.

The most accurate method of adjustment involves adjusting the weather vane by putting it in a wind tunnel. What happens is that the wind tunnel makes it possible to create wind whose direction is perfectly known. A complete weather vane is then adjusted directly according to the direction of the wind provided by the wind tunnel. Under these conditions, a complete weather vane placed on the aircraft is perfectly adjusted.

Now, a system of adjusting weather vanes in a wind tunnel is very expensive. In particular, it requires special infrastructures in which air streams created have a controlled direction. Furthermore, this system is lengthy to implement because the adjusting time is longer in this case. This type of control also involves grounding the aircraft for the duration of the control, and the time that an aircraft spends grounded is also expensive.

Nonetheless, this type of adjustment is feasible for industrial designers or weather vane repair companies who have the means of amortizing the investment in an incidence wind tunnel.

A weather vane is made up of a mechanical wind-sensitive part, the vane and of orientation sensors. The orientation sensors are placed on a probe body via a sensor support. Adjustment is performed by fixing the vane in a known position with respect to the probe body, and by mechanically adjusting the position of the sensor support with respect to this probe body, so that a signal delivered by the sensors in the known vane position has an expected value.

In the state of the art, placing the vane in a known position with respect to the probe body entails the existence and material identification on the vane of a mark corresponding to an aerodynamic zero. The aerodynamic zero is observed in the wind tunnel. It corresponds to the vane being oriented along the axis of the wind from the wind tunnel, and to a corresponding position of the sensor support which, in this case, gives an expected measurement signal (generally a null signal). For this aerodynamic zero, the relative positions of the vane with respect to the sensor support are definitively marked. In practice, this marking is achieved by marking the vane with respect to the probe body and by also marking the sensor support with respect to the probe body. The aerodynamic zero is identified by a hole, made at the factory, in the vane. The precision with which this hole is centered with respect to the theoretical location observed in the wind tunnel is a first error. This first error is known as the precision error.

The principle of adjustment, in the state of the art, is to fix the hole representing the aerodynamic zero in a known position with respect to the probe body, and to place the orientation sensor, with respect to this fixed assembly, in a position such that the measurement signal delivered is the expected measurement signal (generally the null signal). The problem with this type of adjustment is that of getting the fixed assembly, in a reference position, of the probe body and of the vane the same each time during successive adjustments. Because of these multiple interventions, the hole becomes deformed and enlarged. The deformation over time of the hole that symbolizes the aerodynamic zero creates a second type of error. This second type of error is variable over time and is therefore known as the adjustment repeatability error. What happens is that the deformation of this hole leads to the probe body and wind-sensitive part being fixed in varying positions even though this assembly is supposed to be fixed in a unique reference position.

It is an object of the present invention to solve the precision and repeatability errors of the known method of adjusting weather vanes. The subject of the invention is a method for adjusting a weather vane. The principle of adjustment is based on a succession of four steps.

A first step consists in placing the vane, orientation sensor support and probe body assembly in a known and fixed position, using a setting rig. The sensor support and the probe body which are used in this case may be unique factory supports and bodies used for all the vanes manufactured and requiring adjustment. In the fixed position, the sensor support is fixed to the probe body. This assembly is itself fixed to the setting rig. The vane of the weather vane is then pushed against a beam of this rig. A first value of the signal delivered by the sensors, known as the mechanical zero angle, is then measured.

A second step consists in placing this entire device, with the same fixed relative arrangement of the sensor support and of the probe body, on a second setting rig, leaving the vane free to move. During this second step, the vane is subjected to wind from a wind tunnel producing wind whose direction is known with respect to the fixed assembly, and oriented in a direction that is known with respect to the second setting rig. A second value of the signal delivered by the sensors and known as the aerodynamic zero angle is then measured.

During these first two steps, a difference is observed between the signals delivered by the orientation sensors. This difference between the signals delivered is equivalent to an angle through which the vane has turned. This difference is known as the angular difference between the mechanical zero and the aerodynamic zero. In a third step, the value of this angle is recorded on a document that accompanies the vane, or on the vane itself. This angle will then allow the rotation sensors to be adjusted quickly according to the specifics of the mounted vane.

A last step is the only one to be performed on site when a new vane is being adjusted on an existing probe body and orientation sensors assembly, or when readjusting a weather vane.

During the last step, which corresponds strictly to the adjusting action, the vane and the probe body are fixed in a position identical to that of the first step. To do this, a setting rig in every respect identical to the setting rig used in the first step is used on site for adjustment. Adjustment consists then in turning the sensor support about an axis of rotation of the vane with respect to the probe body. This adjustment is performed by measuring the signal produced by the sensors. A sensor support position with respect to the probe body for which the measured signal is equal to the difference between the signals delivered during the first two steps, namely to the angular difference, is adopted. In this case, the weather vane is adjusted with the measurement precision of these sensors, which is far better than the optical or mechanical precision of alignment of a hole as used in the state of the art.

A subject of the invention is therefore a method for adjusting a weather vane in which the weather vane is placed, on site, in a site setting rig, and the position of an orientation sensor that senses the orientation of the weather vane with respect to a probe body of the weather vane and with respect to a vane of the weather vane is mechanically adjusted, characterized in that:

at the factory, the respective positions of the orientation sensor and of the probe body are fixed in a reference relationship, the probe body is placed on a first factory setting rig, the vane is kept in a sustained position which is mechanically known with respect to the first factory setting rig, and a first signal (mechanical zero) delivered by the orientation sensor for this vane position is measured, the weather vane, maintaining the same reference relationship, is subjected to a wind, obtained by a wind tunnel, of known direction with respect to the first setting rig, and a second signal (aerodynamic zero) delivered by the orientation sensor for a vane position corresponding to this wind of known direction is measured, on site, the probe body is placed on a site setting rig identical to the first factory setting rig, the vane is put back in the same sustained position with respect to the site setting rig, and a third signal delivered by the orientation sensor for this sustained vane position is measured the position of the orientation sensor is mechanically adjusted so that the third signal is equal to a difference between the first and second signals (angular difference).

As an alternative, instead of using an orientation sensor measurement instrument, an offset of the sensor body so that angularly this offset is equal to an angular difference deduced or measured from the previous two measurements is measured, on site, during the third step. A subject of the invention is then a method for adjusting a weather vane in which:

the weather vane is placed, on site, in a site setting rig, and the position of an orientation sensor that senses the orientation of the weather vane with respect to a probe body of the weather vane and with reference to a vane of the weather vane is mechanically adjusted, characterized in that:

at the factory, the respective positions of the orientation sensor and of the probe body are fixed in a reference relationship, the probe body is placed on a first factory setting rig, the vane is kept in a sustained position which is mechanically known with respect to the first factory setting rig, and a first angular signal delivered by the orientation sensor for this vane position is measured, the weather vane, maintaining the same reference relationship, is subjected to a wind, obtained by a wind tunnel, of known direction with respect to the first setting rig, and a second angular signal delivered by the orientation sensor for a vane position corresponding to this wind of known direction is measured, on site, the probe body is placed on a site setting rig identical to the first factory setting rig, the vane is put back in the same sustained position with respect to the site setting rig, and the orientation sensor is offset with respect to the probe body so that an offset angle of a reference of the orientation sensor with respect to a reference of the probe body is equal to the difference between the two angular signals.

Another subject of the invention is a device for adjusting a weather vane for measuring the direction of the wind, this weather vane comprising a wind-sensitive vane, secured to a shaft supporting an indicator pointing to an orientation sensor mounted on a sensor support plate, and a probe body, this plate being orientable with respect to the probe body, characterized in that it comprises, for each weather vane, a label for adjusting the plate with respect to the probe body and with respect to the vane once the weather vane is mounted in a setting rig.

Furthermore, the sensor support generally has two rotary sensors driven by the axis of rotation of the vane. For a normal angle of incidence of the wind on the vane (directed more or less along the aircraft fuselage), the two sensors are placed laterally one on each side of this axis of rotation. It would seem that the play of the original axis of rotation, which increases little by little on the axis of rotation of the vane, leads to the indications supplied by the two sensors becoming misadjusted. This misadjustment is all the more difficult to combat as the play of the axis of rotation of the vane remains and changes over time.

The invention seeks to abort the detrimental consequences of this play that cannot be eliminated unless the guides for the vane axis are changed very frequently. The invention has chosen to locate the two rotary sensors in line with the axis of rotation which has the most frequent (or most critical) wind direction. In this position, the play of the axis of rotation remains but its effects are neutralized: the indications supplied by the sensors do not contain error. For another wind direction, but one which corresponds to a less frequent (or less critical) angle of incidence of the wind, the indications are still slightly erroneous, but this is less troublesome because it is less frequent or less critical.

Another subject of the invention is therefore a weather vane for measuring wind direction, comprising a wind-sensitive vane secured to a rotary shaft and driving a measurement member which comprises a set of sensors, each sensor rotating about an axis parallel to the rotary shaft, characterized in that the axes of the sensors are situated in a plane passing through a leading edge of the vane and the rotation shaft of the vane for a main position of the weather vane.

Figure 1B:
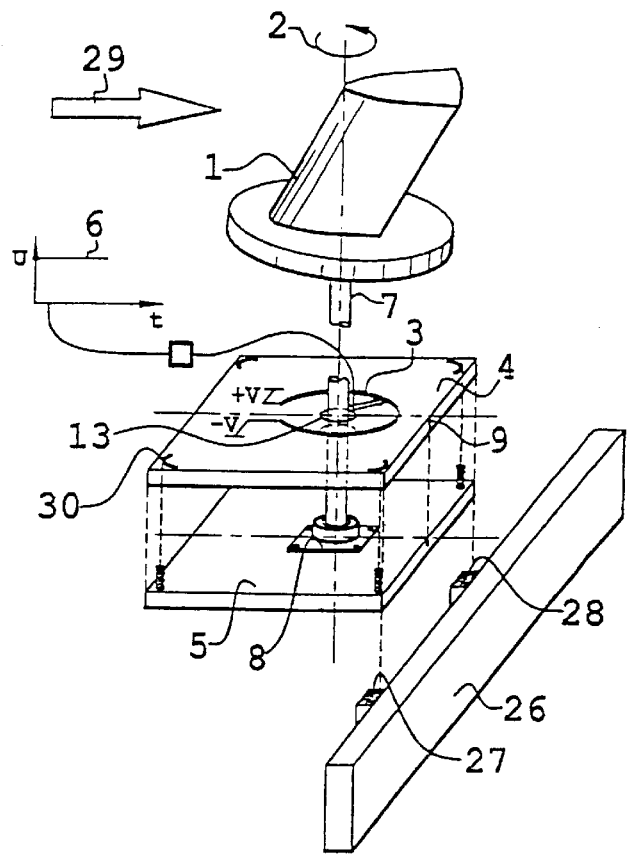
Figure 1C:
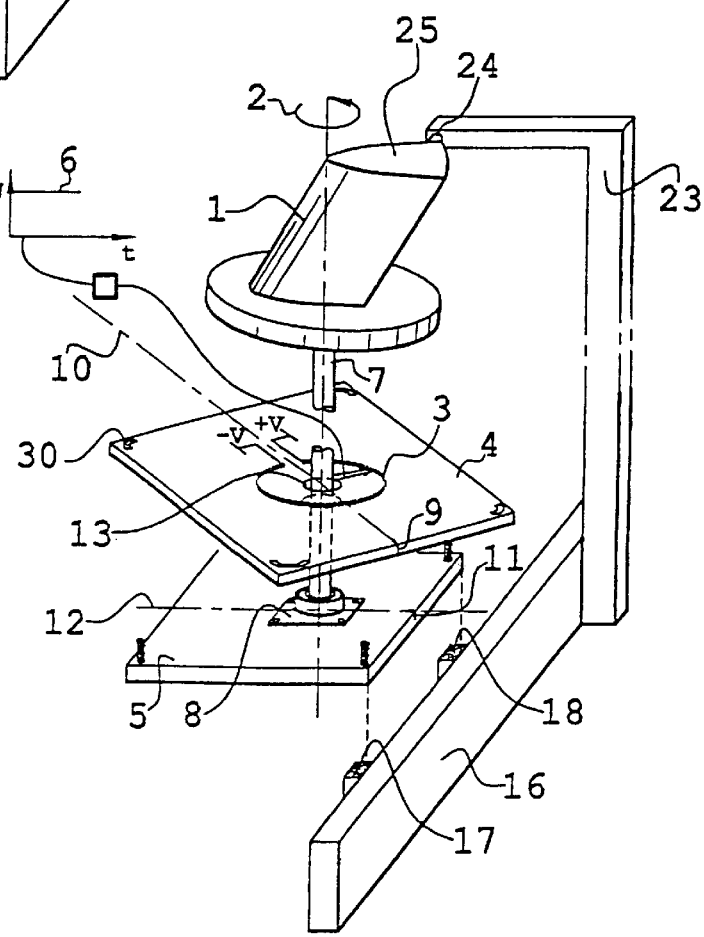
Figure 2A:
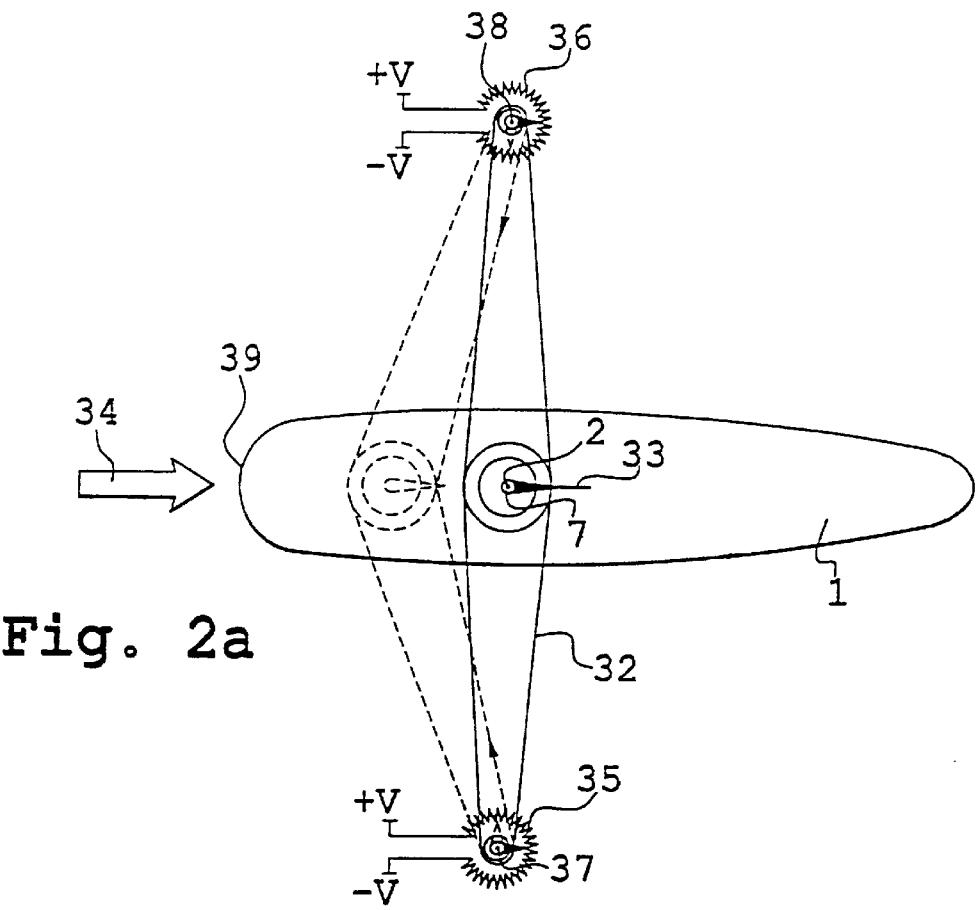
Figure 2B:
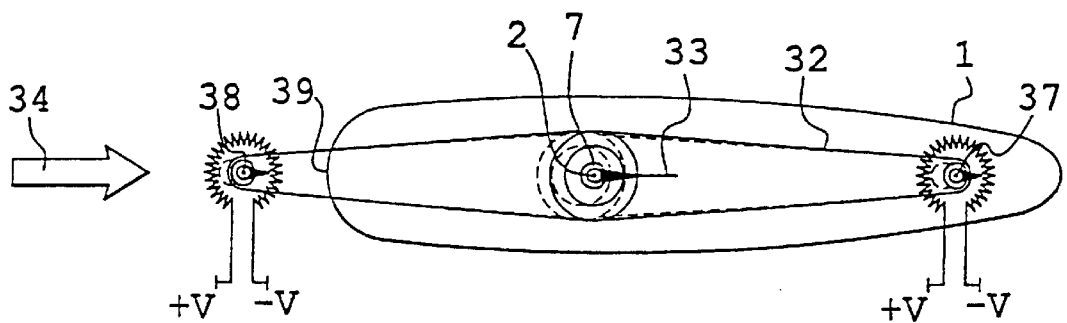

The invention will be better understood upon reading the description which follows and from examining the accompanying figures. These are given merely by way of non-limiting indication of the invention. The figures show:

FIG. 1a: a schematic depiction of a weather vane in a factory setting rig, showing the first step of the invention;

FIG. 1b: a schematic depiction of a weather vane in a setting rig subjected to wind of known direction, showing the second step of the invention;

FIG. 1c: a schematic depiction of a weather vane in a site setting rig, the site setting rig being identical to the factory setting rig. This depiction shows the fourth step of the invention;

FIG. 2a: a schematic depiction of a view from above of a weather vane mounted on an aircraft, having several orientation sensors and subjected to given wind;

FIG. 2b: a schematic depiction of a view from above of a weather vane mounted on an aircraft, having several orientation sensors, subjected to given wind oriented at 90° to that of FIG. 2a and in accordance with the invention.

According to FIGS. 1a to 1c, a weather vane comprises a vane 1 which is a wind-sensitive member able to move about an axis of rotation 2. An orientation sensor 3 is supported by a sensor support plate 4. The weather vane also comprises a probe body 5. The orientation sensor 3 converts the mechanical orientation provided by the vane into an electrical signal 6. The vane 1 is held on the probe body 5 by a shaft 7, the orientation of which is coaxial to the axis of rotation 2. The shaft 7 is fixed to the vane 1. The shaft 7 is held on the probe body 5 by a bearing 8. The bearing 8 gives the vane 1 mobility in a domain that has just one degree of freedom. Specifically, the vane 1 and the shaft 7 can move only in rotation about the axis 2.

The plate 4 can move about the axis of rotation 2. The position of the plate 4 can be defined with respect to that of the probe body 5. The plate 4 has, for example, a mark 9, the mark 9 preferably being engraved on an image of the plate 4. An axis 10 is defined which is orthogonal to the axis of rotation 2 and passes through the mark 9. Likewise, the probe body 5 has a mark 11, which is preferably engraved on the probe body 5. An axis 12 is defined which is orthogonal to the axis of rotation 2 and which passes through the mark 11. The marks 9 and 11 are engraved in such a way that they more or less face each other when the weather vane is mounted. As a preference, the plate 4 is set on the probe body 5 using a system of markings, comprising two gage legs which can give setting precision to within 100th of a degree.

The plate 4 is placed between the vane 1 and the probe body 5. The plate 4 is pierced with a hole 13 to allow the shaft 7 to pass. The hole 13 has a diameter larger than the diameter of the shaft 7. In FIG. 1a, ballbearings 14 and 15 are placed around the shaft 7. The ballbearing 14 holds the vane 1 in rotation with respect to the plate 4. The ballbearing 4 encourages the vane to rotate freely about the axis of rotation 2. The ballbearing 15 forms the bearing 8. It is placed between the probe body 5 and the shaft 7. The ballbearing 14 also allows the plate 4 to rotate about the axis 2 when the position of this plate 4 is being adjusted with respect to the probe body 5. The ballbearings 14 and 15 are not depicted in FIGS. 1b and 1c.

According to one characteristic of adjustment of the weather vane, it is necessary to place the probe body 5 and plate 4 assembly in a known and fixed position known as the reference position. This reference position can be defined, for all probe body 5 and plate 4 pairings of the same type as the one described, by the parallelism of the axes 10 and 12. Nonetheless, this reference position may be any. The benefit of a common reference position is independent of the adjustment with respect to the linearity of the sensors.

In a reference position, the probe body 5 and the plate 4 are placed in a setting rig 16. The setting rig 16 has two blocks 17 and 18 that allow the plate 4 and probe body 5 assembly to be fixed firmly, via the probe body 5, to the setting rig 16. The body 5 is fixed in a characteristic position in which one edge of the probe body 5 occupies a place identical to that which it will later occupy in a site setting rig.

The weather vane depicted here has schematically just one orientation sensor 3. The orientation sensor 3 is fixed to the plate 4. For example, the orientation sensor 3 comprises a potentiometer 19 powered between −V and +V. The signal delivered by the sensor 3 is sensitive to the position of a slider 20 or some other excitation device. The slider 20 is secured to the shaft 7 and is therefore such that its position is dependent upon the orientation of the vane 1. An analog-digital converter 21 allows the value of the voltage supplied by the sensor 20 to be converted into a binary signal 6, the value of which indicates the wind direction. This signal 6 can be displayed on a display 22. As a preference, the orientation sensor 3 has resolvers or synchrodetectors.

The definition of a first characteristic of the mounting of the vane is obtained during the first step of the method according to the invention. In this step, the probe body 5 and plate 4 assembly, connected together in the reference position, is placed in its characteristic position on the setting rig 16. The vane 1 can move. The setting rig 16 has an arm 23. The arm 23 is in the shape of an inverted L and extends vertically with respect to the main body of the setting rig 16. The arm 23 at one end of the L has a ball-shaped stop 24. The ball 24 has, for example, a diameter of several millimeters. The arm 23 and the stop 24 allow the vane 1 to be placed in a sustained and mechanically known position. This arm 23 is designed in particular so that it can be in contact with the vane 1 when the probe body 5 is placed in its characteristic position between the blocks 17 and 18 of the setting rig 16 or on a system of markings of the setting rig 16. The vane 1 has a shape derived from a truncated cylinder. As a preference, the arm 23 is designed so that the ball 24 comes into contact with the vane 1 in the upper part of the vane which is the opposite part to the probe body 5 with respect to the plate 4. More particularly, the ball 24 comes into contact near to a trailing edge 25 of the vane 1, when the vane is oriented according to the wind.

The setting rig 16, defined by the blocks 17 and 18 and an arm 23 having a ball 24, is a reproducible setting instrument. The instrument used at the factory to define the first characteristic of the vane is identical, according to the invention, to those used by airlines when they check weather vanes. In this respect, the setting rig 16 of FIG. 1a is identical to the setting rig 16 of FIG. 1c.

The setting rig 16 is an instrument which also is subject to checks. However, these are simplified because the material of which this setting rig is made is very rigid. The setting rig 16 is subjected therefore only to very small variations in structure. It constitutes a reference apparatus for adjusting weather vanes. The repeatability of the adjustment depends on this setting rig, which is robust. The repeatability of the adjustment is thus improved by the present invention. The vane 1 simply rests against the arm 23 of the setting rig 16. There is therefore no wear on the ball 24.

In the first step of the adjusting method according to the invention, the probe body 5 and the plate 4 are placed, in their mutual reference position, in the characteristic position on the setting rig 16. The vane 1 is then pushed against the ball 24 of the arm 23. This assembly results in a position of the weather vane in a known and sustained position. In this position, the value supplied by the display 22 corresponds to a first value V1.

In a second step of the method, the probe body 5 and the plate 4 are installed, together and without any disassembly, in a second setting dig 26. The setting rig 26 here has an elongate shape and has two blocks 27 and 28 of the same type as the blocks 17 and 18, or has a system of markings. The blocks 27 and 28 allow the plate 4 and probe body 5 assembly to be kept in a second characteristic position. In this setup, according to FIG. 1b, the vane 1 is subjected to a wind 29. The wind 29 has a known direction. The known direction of the wind 29 is defined, for example, with respect to the plane formed by the setting rig 26. As a preference, the direction of this wind is at right angles to the plane formed by the setting rig 26. The vane 1 orientates itself according to the wind. In this position of the vane 1, the value supplied by the display 22 corresponds to a value V2. The value V1 is not normally equal to the value V2.

It is important to note that the rig 26 and the second characteristic position of the probe body 5 in the rig 26 are very closely associated with the rig 16 and with the first characteristic position of the probe body 5. As a simplification, it may be tolerated that, if the value V1 were zero, for perfect alignment between the marks 9 and 11, the value V2 should also be zero. The two setting rigs 16 and 26 have therefore to be produced accordingly. In fact, what is of fundamental importance is the direction of the wind with respect to the rig 26 and to the probe body 5, and the orientation of the rig 26 or of the rig 16 with respect to the fuselage of the aircraft on which the weather vane will be mounted.

The difference between the values V1 and V2 corresponds to an angular difference in the positions of the vane in the two configurations: position set on the setting rig 16 and position in the wind tunnel on the rig 26. The value of this angular difference, or the difference V1−V2 itself, may be marked on the body of the vane 2. It is thus associated with the vane in the form of a label. This value is preferably engraved on the vane. This difference value allows the vane to be adjusted on probe body and plate assemblies other than those at the factory, while Being exactly of the same type as the one in the factory. This adjustment value may also be recorded on a document whose purpose is to accompany the vane.

According to FIG. 1c, the vane 1 is then installed on the probe body 5 and plate 4 setup on site, and this assembly is placed on a site setting rig 16. The probe body 5 and the plate 4 correspond to the elements of the aircraft to which the vane 1 will be fixed. The vane 1 is pushed against the wall 24 of the arm 23 of the site rig 16. The slider 20 therefore points in a known position. The plate 4, supporting the potentiometer 19, is then manipulated with respect to the probe body 5. This manipulation in terms of rotation allows the sensor to be adjusted reliably and in such a way that the signal read off the display 22 corresponds to a value V3. The position to be attained is the one for which the value V3 is equal to the difference in value between V1 and V2.

The plate 4 is fixed to the probe body 5 by kidney slots 30 which face bolts 31, screwed into the probe body 5. The kidney slots are of circular shape, centered on the axis 2. This system allows the position of the plate 4 to be fixed with respect to the probe body 5. The plate 4 may be fixed to the probe body 5 by other means. Adjustment may also be achieved by rotating the stator of the angular position sensor with respect to a plate 4 which is stationary with respect to a probe body 5.

The weather vane according to FIGS. 1a to 1c schematically has just one orientation sensor. In an improvement the weather vane may consist of several orientation sensors which are preferably fixed to the plate 4. According to FIG. 2a of the state of the art, when there are several secondary orientation sensors, the rotation of the secondary sensors is due to drives by a pinion 32 or a rack. The pinion 32, symbolized by a rack, is secured to the rotor of the sensor and is driven by a pinion 33 on the central shaft 7. The rotation of the shaft 7 and therefore of the pinion 33 is directly dependent upon the orientation of the vane 1, according to the wind 34. The orientation indication is provided twice by two distinct secondary orientation sensors: the sensors 35 and 36. To simplify understanding, the secondary sensors 35 and 36 are potentiometers. As a preference, the orientation sensors 35 and 36 are resolvers or synchrodetectors.

The fact of having several orientation sensors multiplies the number of sources of information. What happens is that, if the two orientation sensors do not give the same value, then an alarm signal may be triggered in order to alert the pilot to the malfunctioning of the wind direction measurement device. The aircraft will then need to be flown accordingly.

The secondary sensor 35 has an axis of rotation 37, and the secondary sensor 36 has an axis of rotation 38. The axes of rotation 2, 37 and 38 are mutually parallel and belong in the same plane. The wind creates a drag force which is applied to the only external part of the weather vane: the vane 1. Now, the shaft 7 secured to the vane 1 is also connected to the probe body 5. As the probe body 5 is an internal part of the weather vane, it is not subjected to the drag force. The axis of orientation of the shaft 7 thus deflects slightly from its initial position. As the probe body 5 is secured to the plate 4, and is also secured to the vane 1 via the shaft 7, this may result in an error in the orientation measurement value. The error stems from the play, even small, that exists in the ballbearings 14 and 15.

FIGS. 2a and 2b schematically depict the impact of this deflection in the orientation of the shaft 7, according to the direction of the wind with respect to the plane defined by the axes of rotation 2, 37 and 38. It can thus be seen in FIG. 2a, which represents the state of the art, that the greatest variation in the pinion 33 of the shaft 7 is observed for a main wind directed at right angles to the plane defined by the axes of rotation 2, 37 and 38. This position is the one for which the orientation sensors exhibit, in the evened of deflection, a greater error in the value they supply. What actually happens is that the displacement of the axis 2 causes a slight displacement of the pinion 32, which results in a rotation of the secondary sensors 35 and 36 even though the pinion 33 has not turned.

By contrast, in FIG. 2b according to the invention, the orientation of the plane containing the axes of rotation 2, 37 and 38 is defined so as to cause the minimum error in the value given by the sensors for the main flight conditions. Under these conditions, the orientation of the vane 1 has a leading edge 39 which defines a plane with the axis 2. This plane of the vane, when oriented in a main direction (the most frequent one) of the vane 1, coincides, according to the invention, with the plane containing the axes 37 and 38. The main flight conditions may be those corresponding to the direction of the wind during cruising direction, or those corresponding to stall. In both these instances, they are critical. It is therefore appropriate, according to the invention, that, for these critical directions, the measured values be as accurate as possible, without the errors due to deflection.

Another way of compensating for the error due to the play in the bearings may consist in exerting, on the setting rig 16, a force on the vane corresponding to the aerodynamic drag, during the wind tunnel test. In doing this, a known force is applied to the vane using the site or factory setting rig. The resultant of this known force is orthogonal to an axis of rotation of the vane.

What is claimed is:

1. A method for adjusting a weather vane in which:

the weather vane is placed, on site, in a site setting rig, and a position of an orientation sensor with respect to both a probe body and a vane of the weather vane is mechanically adjusted, wherein:

at a factory, respective positions of the orientation sensor and of the probe body are fixed in a reference relationship, the probe body is placed on a first factory setting rig, the vane is kept in a sustained position which is mechanically known with respect to the first factory setting rig, and a first signal delivered by the orientation sensor for this vane position is measured, the weather vane, maintaining a same reference relationship, is subjected to a wind, obtained by a wind tunnel, of known direction with respect to the first setting rig, and a second signal delivered by the orientation sensor for a vane position corresponding to this wind of known direction is measured, on site, the probe body is placed on the site setting rig which is identical to the first factory setting rig, the vane is put back in the same sustained position with respect to the site setting rig, and a third signal delivered by the orientation sensor for this sustained vane position is measured, the position of the orientation sensor is mechanically adjusted so that the third signal is equal to a difference between the first and second signals.

2. The method as claimed in claim 1, wherein in order to place the vane in the sustained position that is mechanically known with respect to the factory setting rig, a vane of the weather vane is pressed against an arm of the factory setting rig.

3. The method as claimed in claim 1, wherein the difference between the first and second signals is marked on the weather vane, preferably on the vane.

4. The method as claimed in claim 1, wherein a wind of known direction corresponding to a main orientation of a moving part on which the weather vane is mounted is chosen in the wind tunnel.

5. The method as claimed in claim 1, wherein a known force is applied to the vane, using the site or factory setting rig, a resultant of this known force being orthogonal to an axis of rotation of the vane.

6. A method for adjusting a weather vane in which:

the weather vane is placed, on site, in a site setting rig, and a position of an orientation sensor with respect to both a probe body and a vane of the weather vane is mechanically adjusted, wherein:

at a factory, respective positions of the orientation sensor and of the probe body are fixed in a reference relationship, the probe body is placed on a first factory setting rig, the vane is kept in a sustained position which is mechanically known with respect to the first factory setting rig, and a first angular signal delivered by the orientation sensor for this vane position is measured, the weather vane, maintaining a same reference relationship, is subjected to a wind, obtained by a wind tunnel, of known direction with respect to the first setting rig, and a second angular signal delivered by the orientation sensor for a vane position corresponding to this wind of known direction is measured, on site, the probe body is placed on the site setting rig which is identical to the first factory setting rig, the vane is put back in the same sustained position with respect to the site setting rig, and the orientation sensor is offset with respect to the probe body so that an offset angle of a reference of the orientation sensor with respect to a reference of the probe body is equal to the difference between the two angular signals.

7. The method as claimed in claim 6, wherein in order to place the vane in the sustained position that is mechanically known with respect to the factory setting rig, a vane of the weather vane is pressed against an arm of the factory setting rig.

8. The method as claimed in claim 6, wherein the difference between the first and second signals is marked on the weather vane, preferably on the vane.

9. The method as claimed in claim 6, wherein a wind of known direction corresponding to a main orientation of a moving part on which the weather vane is mounted is chosen in the wind tunnel.

10. The method as claimed in claim 6, wherein a known force is applied to the vane, using the site or factory setting rig, a resultant of this known force being orthogonal to an axis of rotation of the vane.

11. A device for adjusting a weather vane for measuring a direction of wind, the weather vane comprising a wind-sensitive vane, secured to a shaft supporting a slider of an orientation sensor mounted on a sensor support plate, and a probe body, the plate being orientable with respect to the probe body, and comprising, for each weather vane, a label for adjusting the plate with respect to the probe body and with respect to the vane once the weather vane is mounted in a setting rig.

12. The device as claimed in claim 11, wherein an indication from the label is engraved on the vane.

13. The device as claimed in claim 11, further comprising a factory setting rig and a site setting rig, the site setting rig being an identical image of the factory setting rig.

* * * * *